Patented Oct. 20, 1931

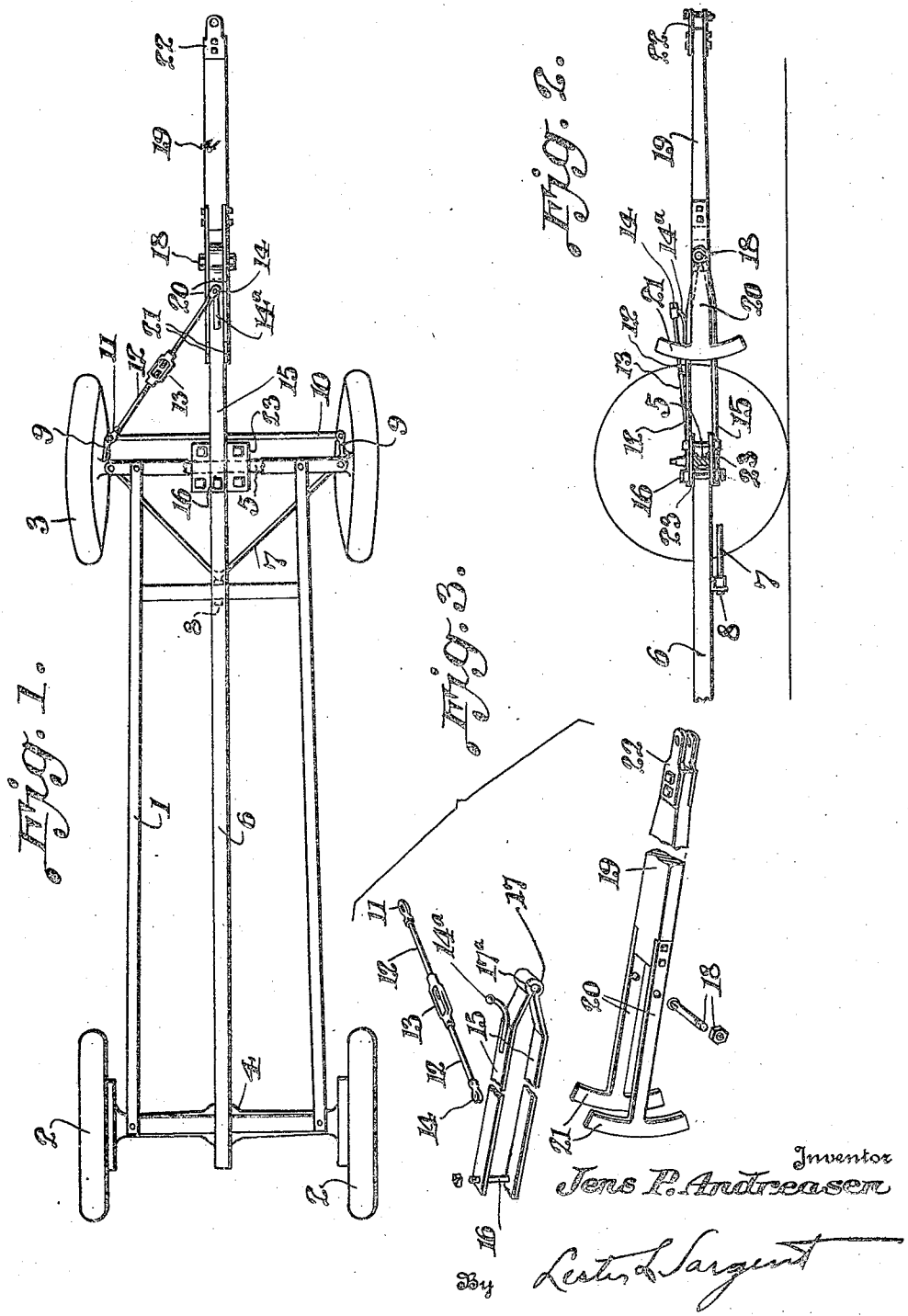

1,827,832

UNITED STATES PATENT OFFICE

JENS PETER ANDREASEN, OF BOSTWICK, NEBRASKA

TRAILER HITCH

Application filed August 25, 1930. Serial No. 477,655.

The object of my invention is to provide an improved trailer hitch which permits the tongue of the hitch to move up and down without hindering or interfering with the following of the trailer and which permits the trailer to follow in the same track as the car pulling it, making for easy turning; and to provide the novel combination and arrangement of parts shown and hereinafter described.

I attain these and other objects of my invention by the mechanism illustrated in the accompanying drawings, in which,—

Figure 1 is a top plan view of the invention;

Fig. 2 is a longitudinal section of same; and

Fig. 3 is a detailed view of several of the parts of the device.

Like numerals designate like parts in each of the several views.

Referring to the accompanying drawings, there is illustrated a conventional chassis 1 on the rear truck 2 and forward truck 3 with rear axle 4 and front cross beam 5 with center bar or iron reach 6 to which radius rods 7 are connected as at 8, as shown in Fig. 2.

I provide horizontally disposed tongue bars 15 which are closed together at the forward end to form the eye member 17 to permit of the bolt 18 being inserted through the opening 17a. The bolt 16 extends through the rear end of tongue bars 15 and through the spaced reinforcement plates 23, as shown in Figs. 1 and 2, to provide a pivot member for tongue bars 15. Bolt 16 passes through the reach, subtongue and plates right behind the axle. The plates 23 are bolted to the axle with four bolts, as shown in Fig. 1.

I provide a ball member 14a affixed to one of the tongue bars 15. Pivotally connected with this ball member 14a is the socket member 14 on the end of the turnbuckle 12. Turnbuckle 12 has the usual turnbuckle sleeve 13 and on its other end is pivotally connected by member 11 to the knuckle joint 9. Member 11 preferably is a clevis.

Either a single turnbuckle 12 and associated parts, as shown in Fig. 1, or a pair of same may be provided. Tongue bars 15 are connected by pivot 16 to member 6 to permit of side swinging movement of the tongue bars in operation.

I provide a trailer hitch tongue 19, having a clevis 22 in its forward end and having vertically disposed metal straps 20 at its rear end, said straps terminating in the upright segment extensions 21. The straps 20 are also apertured and are pivotally connected by a suitable pivot bolt 18 through aperture 17a of block 17 which is bolted between the forward ends of the horizontal tongue bars 15, as shown in Fig. 3.

In operation the pivotal connection 18 between the tongue 19 and the tongue bars 15 permits of up and down movement without hindering or interfering with the following of the trailer; while the pivot 16 permits of all necessary lateral movement of side bars 15. The turnbuckle 12 provides a rigid but adjustable connection between tongue bar 15 and the steering knuckle (or knuckles) 9 and parallel rod 10. The reach 6 is secured to both axles, there being proportionate pull on both axles. The trailer follows in the same tract as the car pulling it, making for easy turning.

The pivot for side movement, as shown in Fig. 1, is positioned directly behind the front axle and passes through the subtongue, upper and lower reinforcement plates 23, and the reach 6, making a very secure fastening for all parts.

What I claim is:

1. In a trailer hitch, the combination of a tongue, vertically disposed straps affixed to and extending rearwardly from the tongue, the straps having upright segmental extensions on the rear ends thereof, horizontally disposed bars having a block bolted between the forward ends of same tongue bars, a pivotal connection between the metal straps and the tongue bar to permit of up and down pivotal movement of the tongue, and a pivotal connection between the rear end of the tongue bars and the reach or center bar of the chassis frame to permit of lateral movement.

2. In a trailer hitch, the combination of a tongue, vertically disposed straps affixed to and extending rearwardly from the tongue, the straps having upright segmental extensions on the rear ends thereof, horizontally disposed bars having a block bolted between the forward ends of same, a pivotal connection between the metal straps and the tongue bar to permit of up and down pivotal movement of the tongue, a pivotal connection between the rear end of the tongue bars and the reach or center bar of the chassis frame, a turnbuckle having one end pivotally connected to one of the horizontal tongue bars and having the other end pivotally connected with the outer end of a steering knuckle.

JENS PETER ANDREASEN.